(No Model.)

J. GIBBONS.
BREAST CHAIN.

No. 301,491. Patented July 8, 1884.

Witnesses:
Geo. F. Hyde
Charles S. Brintnall

Inventor:
John Gibbons
by W. E. Hagan his atty

UNITED STATES PATENT OFFICE.

JOHN GIBBONS, OF WEST TROY, NEW YORK, ASSIGNOR TO THE MENEELY HARDWARE COMPANY, OF SAME PLACE.

BREAST-CHAIN.

SPECIFICATION forming part of Letters Patent No. 301,491, dated July 8, 1884.

Application filed March 18, 1884. (No model.)

*To all whom it may concern:*

Be it known that I, JOHN GIBBONS, of the village of West Troy, county of Albany, State of New York, have invented a new and useful Improvement in Breast-Chains for Animal-Harness, of which the following is a specification.

My invention relates to that class of devices which are used to connect the hames of harness with the poles of vehicles, and which are termed "breast-chains." This class of devices as heretofore made have been constructed with a ring, which was passed on over the chain before the latter was connected with the hame-rings, and which ring, as thus passed over the chain, was adapted to connect with the vehicle-pole. In another class of devices of this kind a link variously shaped was attached to the breast-chain centrally between its ends, and which link, by means of an eye formed therein, was adapted to connect with the pole. Where a ring was used, as before described, the passage of the chain through it rapidly wore it out when in use, and when a link was employed which connected with the chain centrally it limited the holdback capacity of a team to one of the animals should the other shirk the duty.

The object of my invention is to combine with a breast-chain a device by which the holdback capacity of the animals is equally thrown upon both of them by making the connection between the breast-chain and pole movable on the former, and as when a ring is used, but which improved device will have such elements of strength in its construction as makes it more durable and more readily adjustable than the movable ring before described.

My invention consists, as will be more definitely defined hereinafter in the claim, in the combination of a breast-chain that is constructed to attach at each end to one of the hame-rings, of a tube that is slightly curved between its ends, is adapted for the passage of the chain through it, and is made to have an offset-eye upon one side for its connection with the vehicle-pole.

Figure 2:
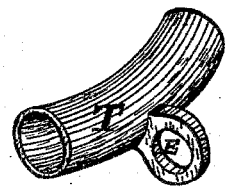
Figure 1:
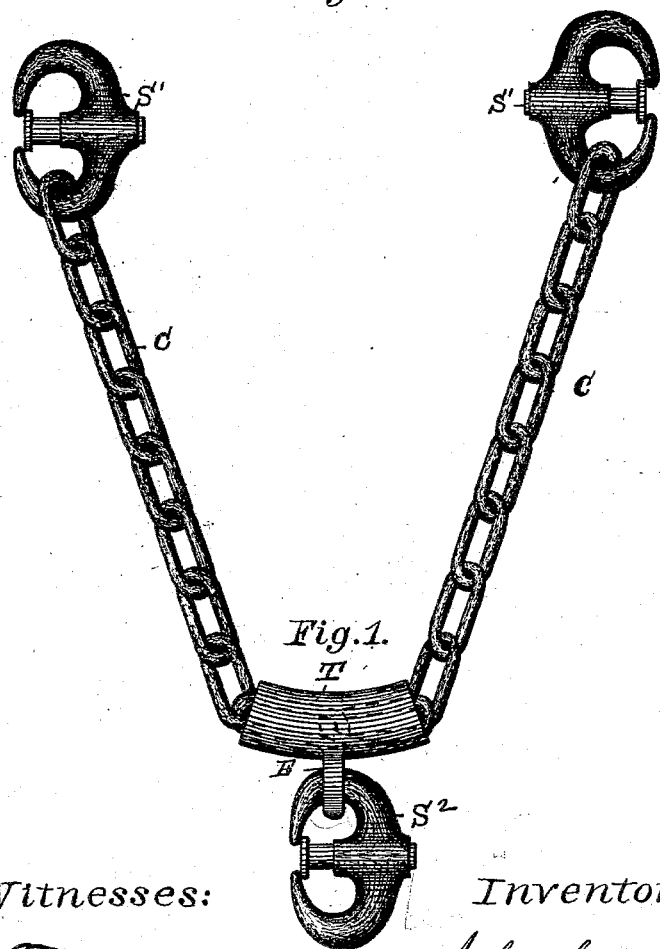

In the accompanying drawings, forming a part of this specification, there are shown two figures illustrating my invention, with the same designation of parts by letter-reference used in both of them. Of these illustrations, Figure 1 shows the chain as completed, and Fig. 2 illustrates the combined tube and offset-eye removed from the chain.

The parts of the apparatus are designated by letter-reference, and their function is explained as follows:

The letter C indicates the chain made to attach to the hame-rings by snaps S' S', and the letter T designates a short piece of tube that is slightly curved between its ends, and is constructed with an offset-eye, E, for connection with a vehicle-pole by a snap, $S^2$, or any other well-known means. The chain C, as shown at Fig. 1, is passed through the tube when in use, and is therein free to move back and forth with the vibrations of the pole. As thus made it will be readily seen that the tube has a long bearing on the passing chain, and consequently it will not cut into so as to wear the chain as well as itself by the contact when being adjusted on the chain under a heavy tension-strain. The tube T and its combined offset-eye are preferably made of one piece of malleable cast metal; and, if desired, the tube may be made shorter or longer, or have less or more curve than I have shown it to have, and still carry out the purposes of my invention.

Having thus described my invention, what I claim, and desire to secure by Letters Patent, is—

In a breast-chain, the combination of the chain C, adapted at each of its ends to connect with a hame-ring, the tube T, constructed to be threaded onto said chain, and the eye E, constructed on said tube, substantially as and for the purposes set forth.

Signed at Troy, New York, this 18th day of February, 1884, in the presence of the two witnesses whose names are hereto written.

JOHN GIBBONS.

Witnesses:
CHAS. D. MENEELY,
CHARLES S. BRINTNALL.